US009307355B2

(12) United States Patent
Nehrenz et al.

(10) Patent No.: US 9,307,355 B2
(45) Date of Patent: Apr. 5, 2016

(54) LOCATION ENABLED SERVICE FOR ENHANCEMENT OF SMART DEVICE AND ENTERPRISE SOFTWARE APPLICATIONS

(71) Applicant: BlueCats Australia Pty Limited, North Sydney, NSW (AU)

(72) Inventors: Kurt Nehrenz, North Sydney (AU); Victor Cody Singleton, Austin, TX (US); Randall Stanley, Huntsville, AL (US)

(73) Assignee: Bluecats Australia Pty Limited, North Sdney, Nsw (AU)

( * ) Notice: Subject to any disclaimer, the term of this patent is extended or adjusted under 35 U.S.C. 154(b) by 135 days.

(21) Appl. No.: 14/316,564

(22) Filed: Jun. 26, 2014

(65) Prior Publication Data
US 2015/0005011 A1 Jan. 1, 2015

Related U.S. Application Data

(60) Provisional application No. 61/840,412, filed on Jun. 27, 2013, provisional application No. 61/892,178, filed on Oct. 17, 2013, provisional application No. 61/923,154, filed on Jan. 2, 2014.

(51) Int. Cl.
*H04W 4/02* (2009.01)
*H04W 4/00* (2009.01)
*H04W 4/18* (2009.01)

(52) U.S. Cl.
CPC ............ *H04W 4/02* (2013.01); *H04W 4/003* (2013.01); *H04W 4/008* (2013.01); *H04W 4/023* (2013.01); *H04W 4/185* (2013.01)

(58) Field of Classification Search
CPC ..... H04W 4/003; H04W 4/185; H04W 4/008; H04W 4/023; H04W 4/02
See application file for complete search history.

(56) References Cited

U.S. PATENT DOCUMENTS

| | | |
|---|---|---|
| 2005/0064877 A1 | 3/2005 | Gum |
| 2008/0051130 A1 | 2/2008 | Juneja et al. |
| 2010/0309051 A1 | 12/2010 | Moshfeghi |
| 2011/0028160 A1 | 2/2011 | Roeding et al. |

(Continued)

OTHER PUBLICATIONS

PCTUS1444728 International Search Report and Written Opinion of the International Searching Authority, Nov. 4, 2014.

(Continued)

*Primary Examiner* — Dinh P Nguyen
(74) *Attorney, Agent, or Firm* — James Richards

(57) ABSTRACT

A system for contextualized location aware content delivery comprising a group of beacons transmitting respective ID's, an application running on a smart device configured for receiving the beacons, determining signal amplitude, reception time, beacon ID, and sending ID and amplitude to a server over a network. The server determines location of the smart device and contextualizes the location based on a context location database with the server. Context information sent back to application. Application sends context information along with user action information to an application server over a network. Application server sends context related information to application for display to a user on said smart device. The server, application, and beacons may be provided as a service to a facility for use with customer's smart devices. A beacon ID security method is disclosed. Beacons may include precision location technology and relay information to one another and to the server.

15 Claims, 20 Drawing Sheets

(56) References Cited

U.S. PATENT DOCUMENTS

| | | |
|---|---|---|
| 2011/0178863 A1 | 7/2011 | Daigle |
| 2011/0211563 A1 | 9/2011 | Herrala et al. |
| 2011/0282901 A1 | 11/2011 | Marks et al. |
| 2012/0184295 A1 | 7/2012 | Mitsuya et al. |
| 2012/0235812 A1 | 9/2012 | Maia et al. |
| 2013/0029685 A1 | 1/2013 | Moshfeghi |
| 2013/0238540 A1 | 9/2013 | O'Donoghue |

OTHER PUBLICATIONS

PCTUS1444728 International Preliminary Report on Patentability Jun. 25, 2015 International Preliminary Examining Authority, IPEA/US.

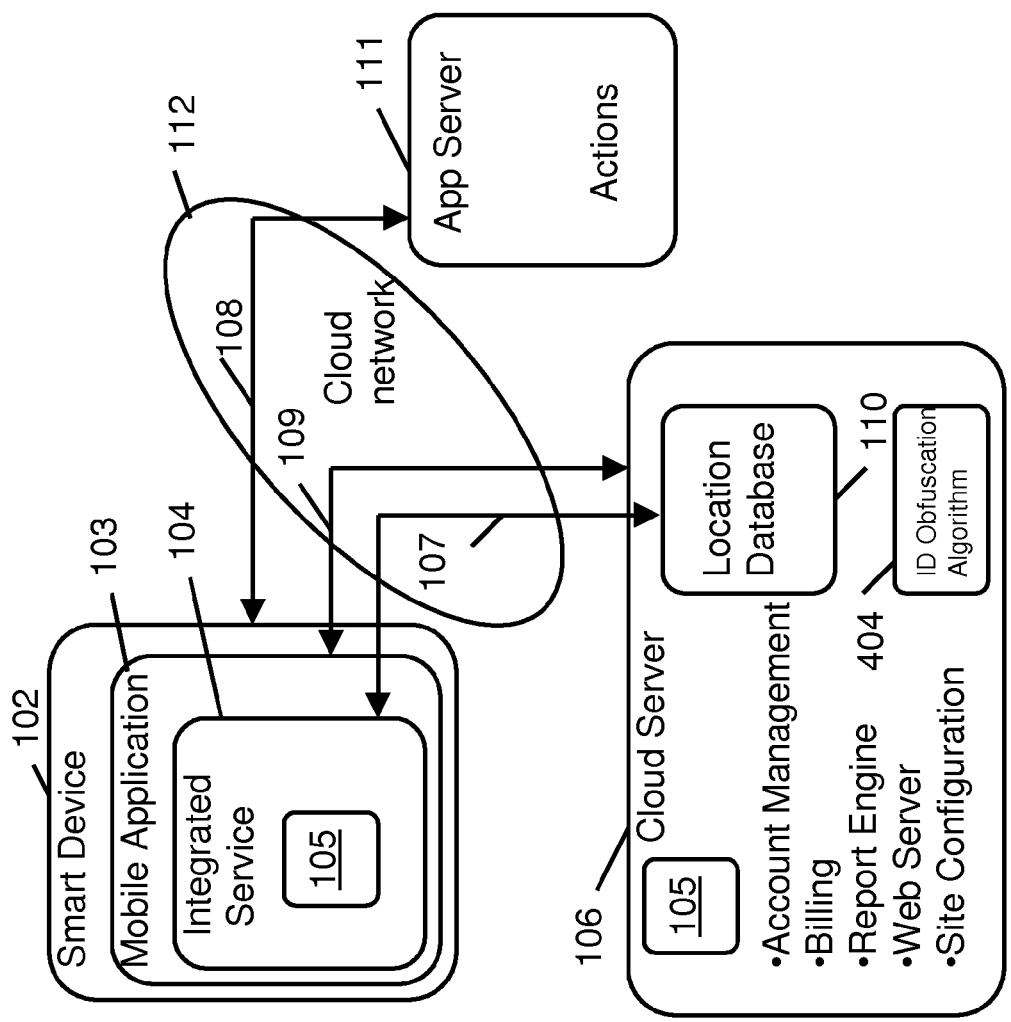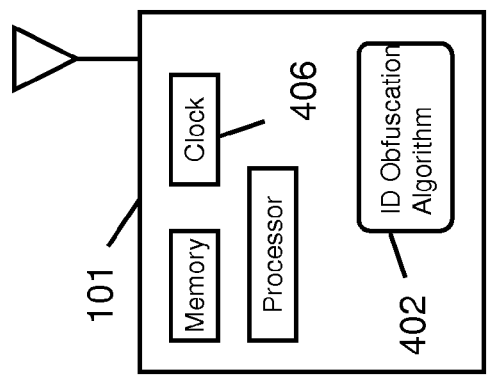
Fig. 4

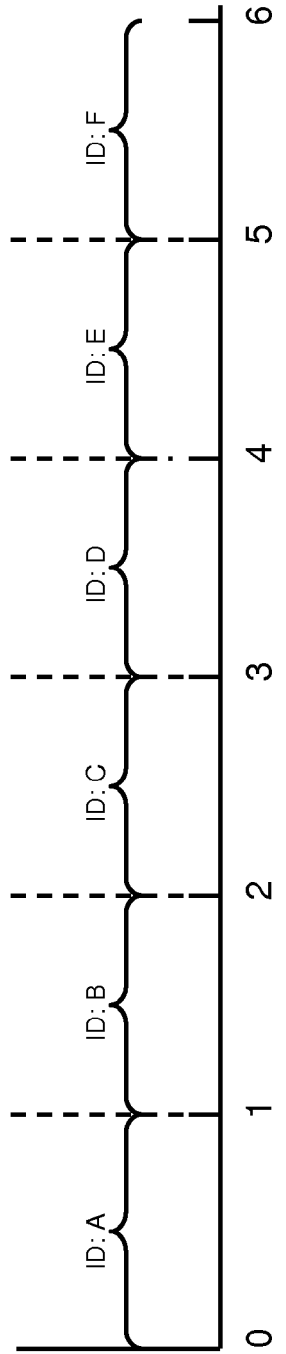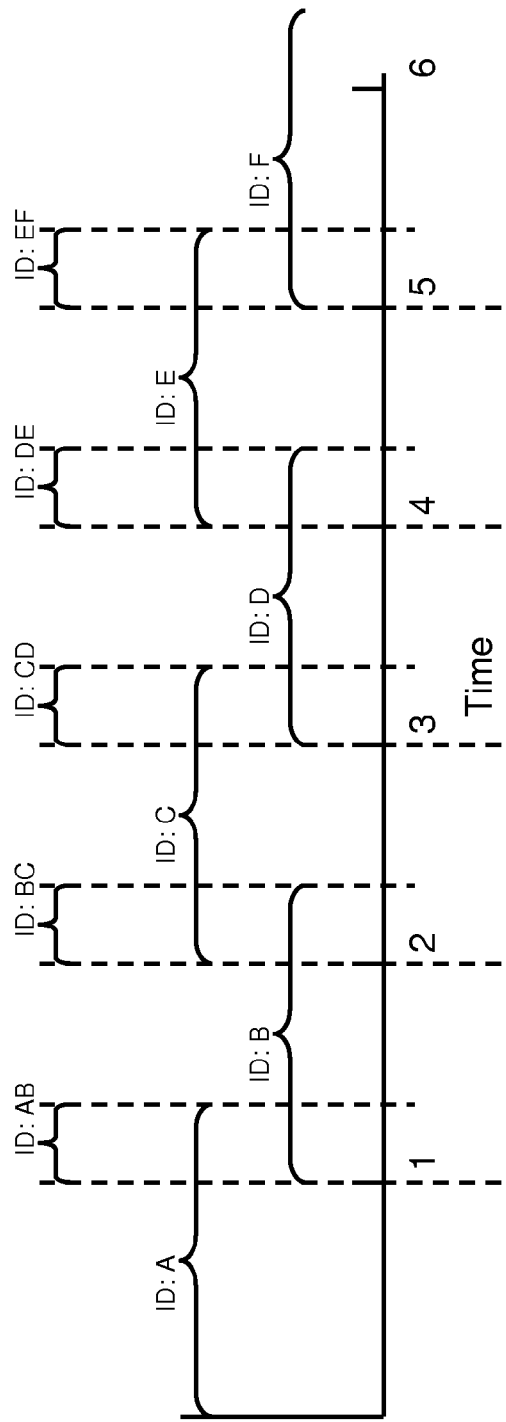

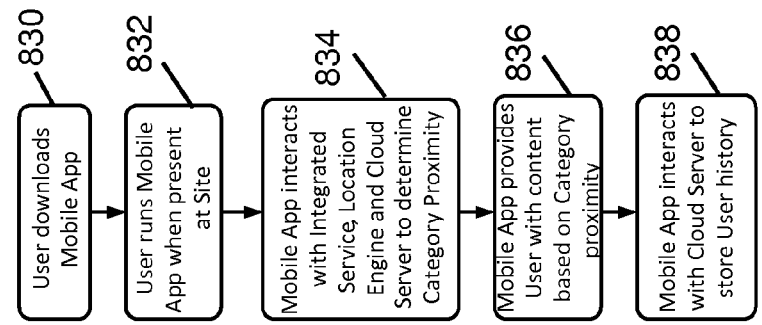
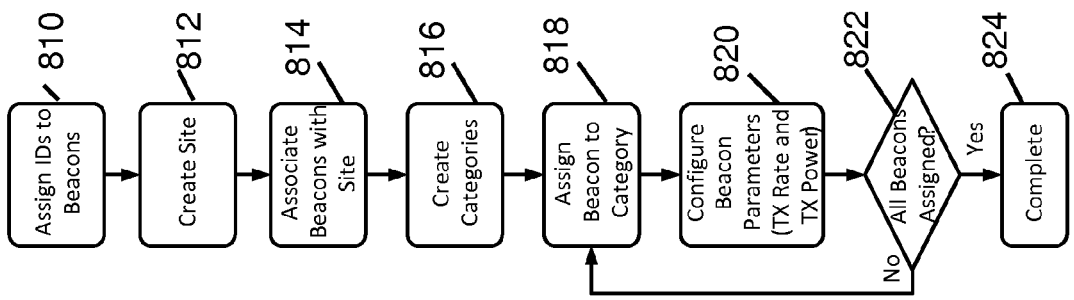
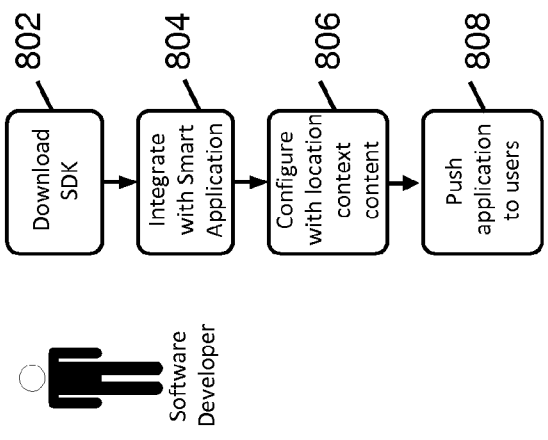

Time of Flight = Time 2 – Time 1 – Transceiver 2 processing time
Distance between beacons = Time of Flight x Speed of Light/2

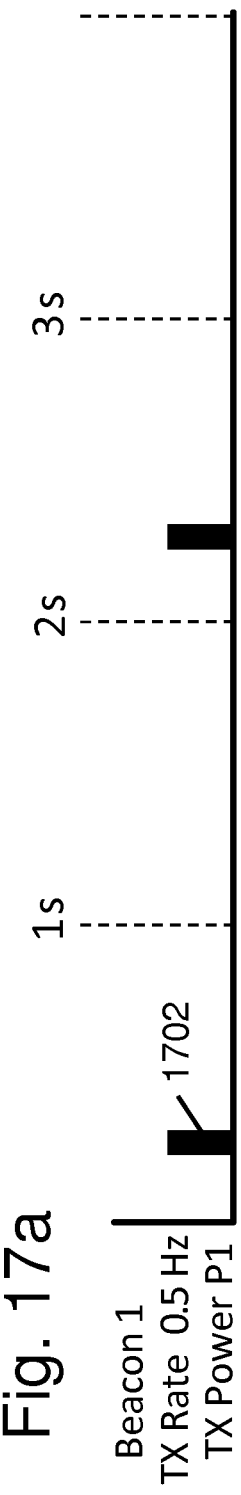

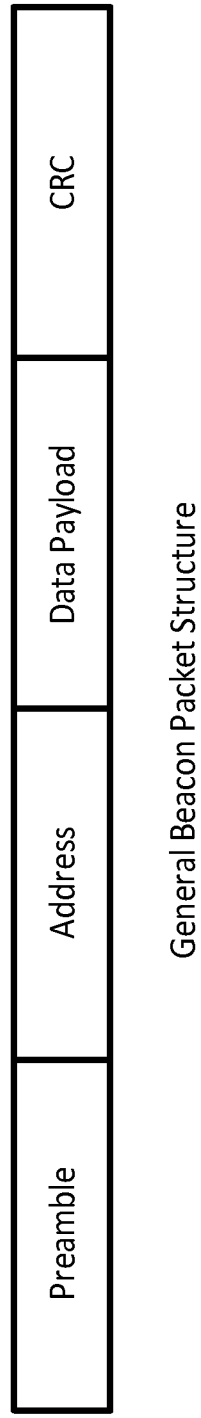

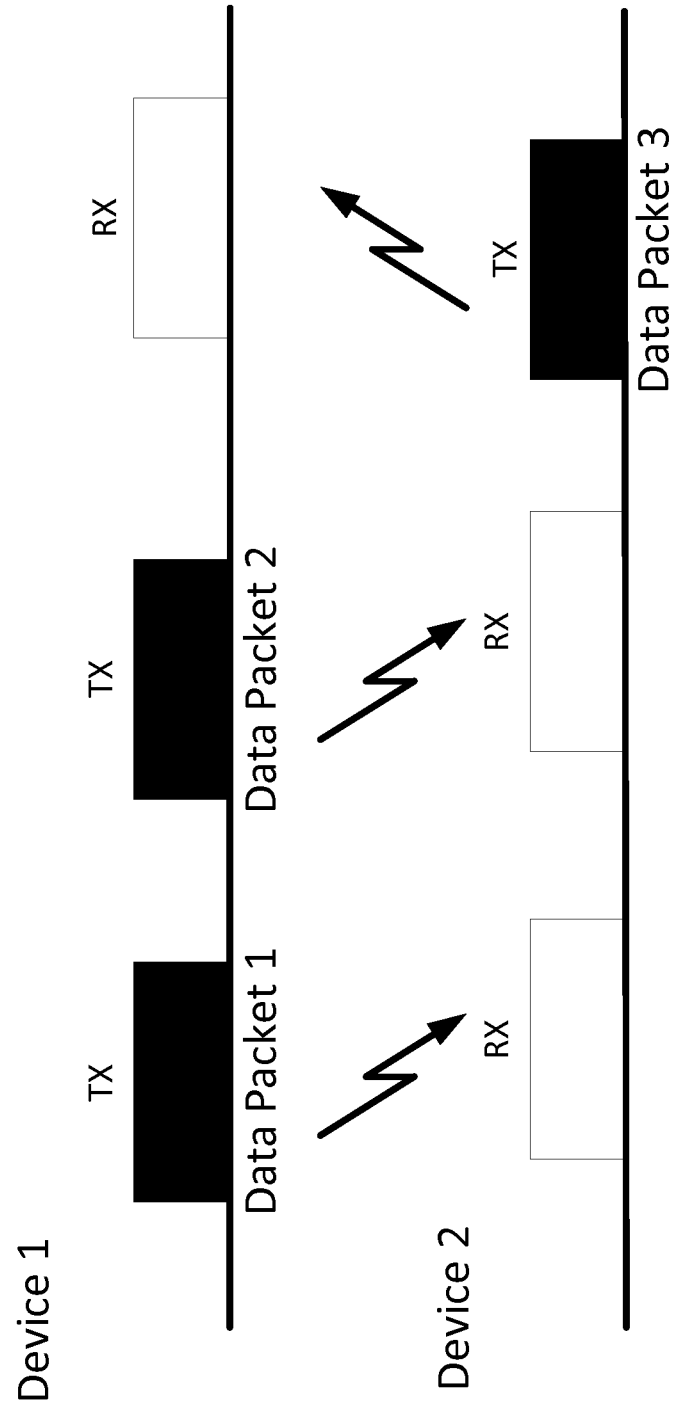

LOCATION ENABLED SERVICE FOR ENHANCEMENT OF SMART DEVICE AND ENTERPRISE SOFTWARE APPLICATIONS

RELATED APPLICATIONS

This application is a nonprovisional application claiming the benefit under 35 USC 119(e) of provisional application 61/840,412 titled: "Enterprise Software Enhancement Enabled by contextualized Location Service" filed Jun. 27, 2013 by Singleton et al.; this application claims the benefit under 35 USC 119(e) of provisional application 61/892,178 titled: "Beacon Obfuscation By Time Based Association Key", filed 17 Oct. 2013 by Nehrenz et al.; this application claims the benefit under 35 USC 119(e) of provisional application 61/923,154 titled: "Beacon Obfuscation By Time Based Association Key" filed Jan. 2, 2014 by Nehrenz et al. All of the above patent documents are incorporated herein by reference in their entirety.

BACKGROUND

1. Technical Field

The present disclosure pertains generally to the field of solutions utilizing the location of people or assets, more particularly, location information based at least in part on position information derived from radio frequency transmitters and associated with pre-configured zones or categories, and provided as a service for integration with smart device applications and enterprise software solutions.

The present disclosure relates further to the field of information security, more particularly to securing of asset association information through the obfuscation of radio frequency transmitter identification codes.

2. Brief Description

The present disclosure relates generally to a system for contextualized location aware content delivery comprising a group of beacons transmitting respective ID's, an application running on a smart device configured for receiving the beacons, determining signal amplitude, reception time, beacon ID, and sending ID and amplitude to a server over a network. The server determines location of the smart device and contextualizes the location based on a context location database with the server. Context information sent back to application. Application sends context information along with user action information to an application server over a network. Application server sends context related information to application for display to a user on said smart device. The server, application, and beacons may be provided as a service to a facility for use with customer's smart devices. A beacon ID security method is disclosed. Beacons may include precision location technology and relay information to one another and to the server.

The present disclosure further relates generally a system for providing secure access to the location of people or assets (including smart devices) derived from radio frequency transmitters associated with pre-configured zones or categories. The association of radio frequency transmitters with the pre-configured zones or categories may be stored in a library maintained on a smart device or on a system server. A smart device may be, for example but not limited to, a cell phone, or tablet computer, or other multifunction device.

The system maintains a library of asset location information that is utilized to provide users with valuable information about the asset by location association. For example, when the user is in proximity to the asset, information related to the asset is displayed on the smart device. The system operated as authorized by the store owner or manager is referred to as the authorized system or approved system utilizing the approved or authorized library. It is possible that a competitor may wish to utilize the beacons and generate a competing information service highlighting different products or giving different information. The competing service is referred to as the unauthorized or unapproved service using an unapproved or unauthorized library.

In one variation, construction of a non-public authorized library is obfuscated, i.e., made obscure, by changing publicly available properties of a radio frequency beacon at specified intervals according to a mathematical function known only to the system that maintains the approved library.

In one variation, the transmitters may be Bluetooth® and Bluetooth Smart® beacons whose properties, including identification and signal strength may be accessible by any Smart Device with Bluetooth® capabilities.

The present disclosure further relates generally to a system and method for enhancing enterprise software systems by providing the location of assets or people as an integrated service based at least in part on position information derived from radio frequency transmitters and associated with pre-configured zones or categories. In one variation, the transmitters may be Bluetooth® and Bluetooth Smart® beacons. The beacon information including identification and signal strength may be derived by observing the received beacon signal at a user terminal (for example, smart device). In one variation, the system derives proximity information of the user to the beacon and associated zones or categories at the deployment site (for example, products in a store). In another variation the system may derive a distance value from a beacon or may derive a two or three dimensional position value from the one or more beacons. The position information may then be contextualized by association with pre-configured location zones or categories used to enable the delivery of context specific information or the trigger of a context specific event. Examples of delivering context specific information may be the provision of retail product specials, e-coupons, surveys, or historical location to a user via a smart app. An example of triggering a context specific event may be the dispensing of a product or item, via a vending machine or mobile/fixed terminal, based on the proximity of a specific user's smart device, verified by the collected location information, to the said vending machine or mobile/fixed terminal. The user may be connected by a smart device application (app) through the location service to a local server or remote server in the cloud (internet) that maintains customer accounts including location history and preferences. The smart device's historic location information may be recorded with a time marker for future reference on either local or cloud based servers. For example a device's historic location and time marker can be used to identify what the user was doing at a specific location, when referenced to data relating to their actions performed at that corresponding time within an app on a smart device. One example of this could be the precise location of a user's smart device when they submitted a response to a survey question.

In a further variation, the beacon device may include receive and/or transceive capability in addition to beacon functionality. The transceive capability may be on the same or different network technology, For example the beacon may be Bluetooth®, whereas the network may be Bluetooth® or WiFi®. The beacons may relay information from beacon to beacon to from an interface to the Cloud server as desired.

3. Transceive Beacon

In a further variation, the beacon device and/or the mobile device may include transceive capability. The beacon device may transmit a beacon signal receivable by a mobile device as a one way transmission. The beacon device may also include receive and/or transceive capability to enable additional optional functionality. A beacon device with transceive capability may receive mobile signals and as a minimum gather statistics and usage data on mobile devices coming within proximal range to the beacon. With further capability, the transceive beacon may interact with the mobile device and potentially interact with the user via a user interface screen of an application program (ap) running on the mobile device. The beacon signal may be a short range signal, for example Bluetooth®. The mobile device may also include cell phone capability and may connect to a server using a cell phone network. Thus, the mobile device may detect and interact with the beacon using a first RF signal (e.g. Bluetooth®) and interact with a server using a second RF signal (cell phone, WiFi® or other). Beacon data, including historical usage data, may be conveyed to the server by a user system of opportunity that happens to interact with the beacon and also connect to the server. Alternatively, the beacons may be networked among themselves to connect through store installed equipment to the server and thus report usage statistics on a more reliable or regular basis.

In a further variation, the mobile device may be an anonymous device, for example, an RF transceiver installed on a shopping cart or hand basket. The RF transceiver may be a simple inconspicuous tag or may be a user terminal providing customer information and user interface capability.

The mobile transceiver may support the identified communication method (such as Bluetooth® low energy) and protocol (such as iBeacon®). The mobile transceiver may be associated with a user, either as an identified user (as in a shopper loyalty system), or with an anonymous user (e.g., shopping cart). The transceiver may preferably be able to work in an ad hoc networking fashion as it enters and exits the range of other transceivers. The transceiver may have a memory element adequate to store associations and timestamps of other transceivers within range, and may support the means of transferring database content to other nodes in the ad-hoc network.

The system of which the transceivers are a part may support association of a transceiver with a category (fixed beacon mode) or with a mobile person or asset. This may be considered a superset of category association, where categories could be based on elements associated with a fixed location, or categories that are individuals or other mobile assets.

One optional feature may be a means of upgrading or altering the firmware of the beacon device over the air, primarily for the purpose of updating supported protocols, and to change the function and parameters of the ad hoc network.

Another optional feature may be an ability of the transceiver to capture and forward the RSSI or other location enabling information from other nodes in the network. Thus, the server can gather the location enabling information from multiple devices at known locations and calculate a near realtime location of each transceiver. The location information could be used to determine a higher fidelity position as the transceiver transitions between categories, and to capture a higher precision path of the transceiver through the site.

The disclosure also describes related methods including:

A method for contextualized location related content delivery comprising:

providing at least one beacon configured for transmitting an identification; providing an application configured for being downloaded and for running on a smart device;

the application may be configured for utilizing said smart device to receive the at least one beacon, determine a reception amplitude, determine said identification, send said identification, and said amplitude information to a network server over a network; the network server receiving said identification information and said amplitude information from said application.

The network server determining proximity data based on said amplitude information;

The network server further comprising a context database relating proximity data to context data; and the network server utilizing said context database to determine context location information based on said proximity information. The network server communicating said context location information to said application over said network.

The application may to send the context location information to an application server and receive context related content based on the context location information from the application server for display on the smart device.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

The current invention will be more readily understood from the following detailed description, when read in conjunction with the accompanying drawings, in which:

FIG. 4 illustrates an exemplary system wherein the identifiable Beacon Properties (ID) change simultaneously on the beacon itself and in the approved Contextualized Location library.

FIG. 5a and FIG. 5b illustrate an exemplary time synchronous method by which the identifiable Beacon Properties change according to a secret mathematical function.

FIG. 8a through FIG. 8c show exemplary user tasks for various potential users and implementers of the system.

FIG. 17a through FIG. 17c illustrate various beacon transmission repetition rates that may be used simultaneously with the present system.

FIG. 18a and FIG. 18b illustrate exemplary beacon packet structures.

FIG. 20a and FIG. 20b illustrate and exemplary timing diagram for a connectionless protocol for use with the present system.

DETAILED DESCRIPTION

Figure 1:
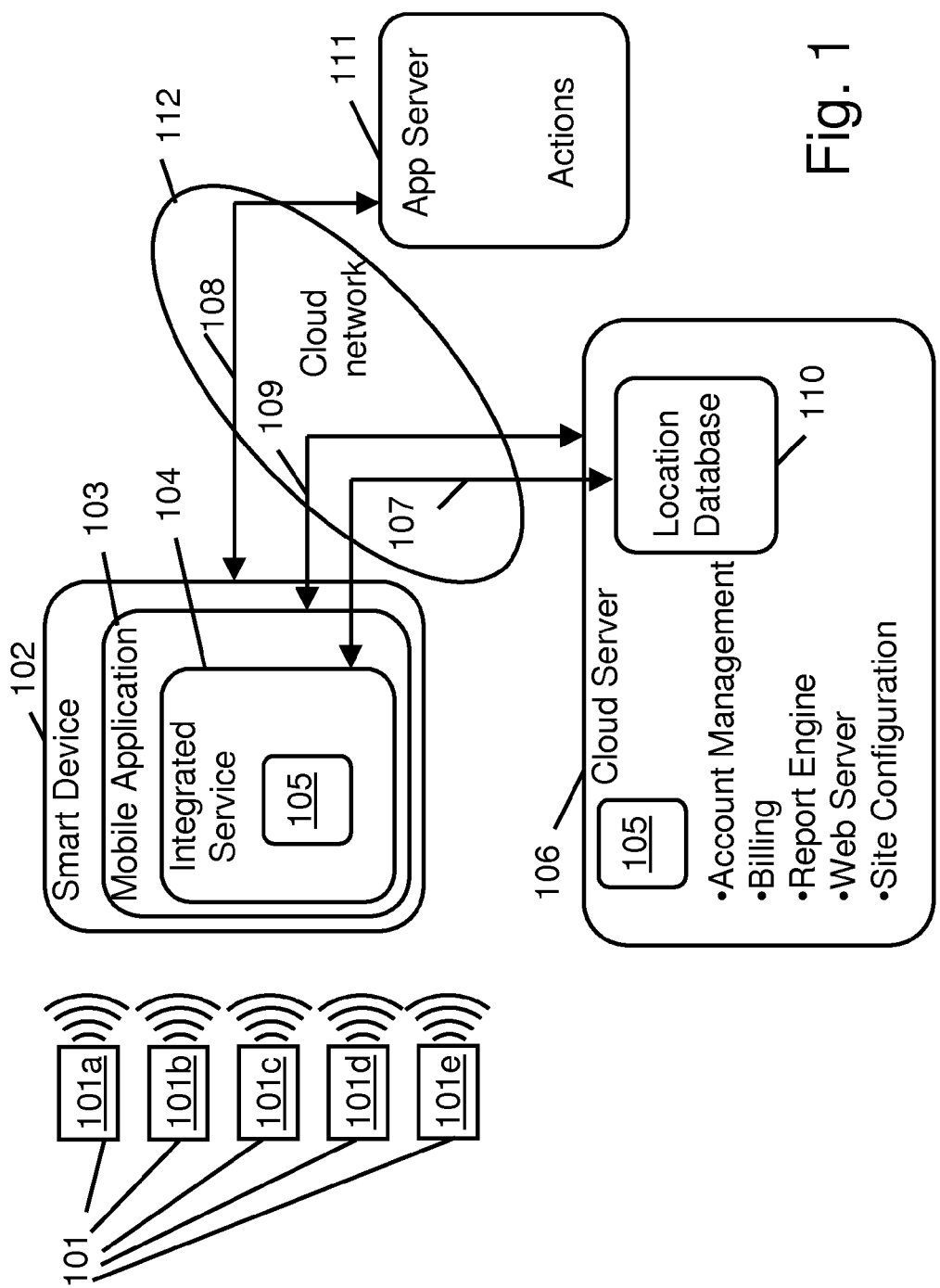
FIG. 1 illustrates an exemplary smart device user enhancement system.

FIG. 1 illustrates an exemplary smart device user enhancement system. A plurality of beacons are deployed in designated locations. Each beacon may transmit a beacon identification, for example, identification number, for example, ID1, ID2.

The integrated location service may use and record the received beacon signal strength and received signal timestamp and/or may use or relay information relating to the received beacon signal strength or absence of received beacon signals to derive device location.

Referring to FIG. 1, the reference numbers refer to the following functions:

- 101 Each of a plurality of beacons transmit the beacon's unique ID, transmitted and received signal strength and other information, as configured. 101 refers to beacons generally. 101a through 101e refer to specific beacons.
- 102. User's Smart device receives the beacon information.
- 103 User's Mobile Application running on the user's smart device
- 104 Integrated service running on the user's smart device allows selective filtering of beacon information and communicates with a cloud server passing signal strength information and/or location engine results, as available.
- 105 Location engine runs algorithms either on the smart device or on the cloud server to determine relative locations of beacons and the smart device.
- 106 Cloud server maintains location database 110, location engine 105, various client account information including but not limited to report engines, billing, web server, site configuration etc.
- 107 Cloud server converts location engine results into contextualized location information by using the location database. The contextualized location information is then communicated to the smart device via the cloud networks, which may include for example, WiFi®/3G/4G or other networks.
- 108 Smart device app can then initiate a number of actions through the cloud network 112 including an ask and receive action, to its application server 111 based on the contextualized location information received.
- 109 Smart device mobile application 103 logs user actions with time markers and sends the information 109 via the cloud network 112 to the cloud server 106.

A user (for example, a store customer) may run an application (app) on a smart device that connects to the store shopping system. The store shopping system may be hosted on a server over the internet. Thus, the store is not required to have or maintain any server equipment or internet equipment at the store. Only beacons are required at the store.

The smart device app, integrated with the contextual location service, may run on any of the operating systems, for example IOS®, Android® or other operating system. The location service of the system may be implemented on the smart device, on a local server, on a cloud server, or distributed across multiple devices.

One or more locating algorithms may be implemented to provide the highest accuracy position information as a basis for context association. Several variations of location determination can be implemented based only on the received signal strength of one or more beacons. A basic variation of location determination involves observing the signal strength of the beacons and determining the closest zone or category based on the strongest beacon signal. This method may be enhanced by observing the signal strength and then estimating distance probability with a propagation model for that beacon. The propagation model may be a simple free space model, or may include specific patterns for the beacon in that environment. In another variation, the location service may use signal strength or distance information from two or more beacons to further refine the smart device's position within the zone or category.

In another variation, device location may be determined using a Simultaneous Location and Mapping (SLAM) algorithm, in which the device location is determined relative to a map that is iteratively improved with updated locations and sensor characterization data. Sensors such as accelerometers available to the Smart Device application may be utilized to refine an estimation of motion and position. User input to the map may be an additional refinement mechanism by incorporating truth data at select points on the map.

A context location for example may be a region in a store having related subject matter, e.g., meat department.

Proximity location or coordinate location may be a distance based location information, which may be a location on a map of a store or distance from a beacon, e.g., a location in linear coordinates, without knowledge of the product layout of the store.

Figure 14:
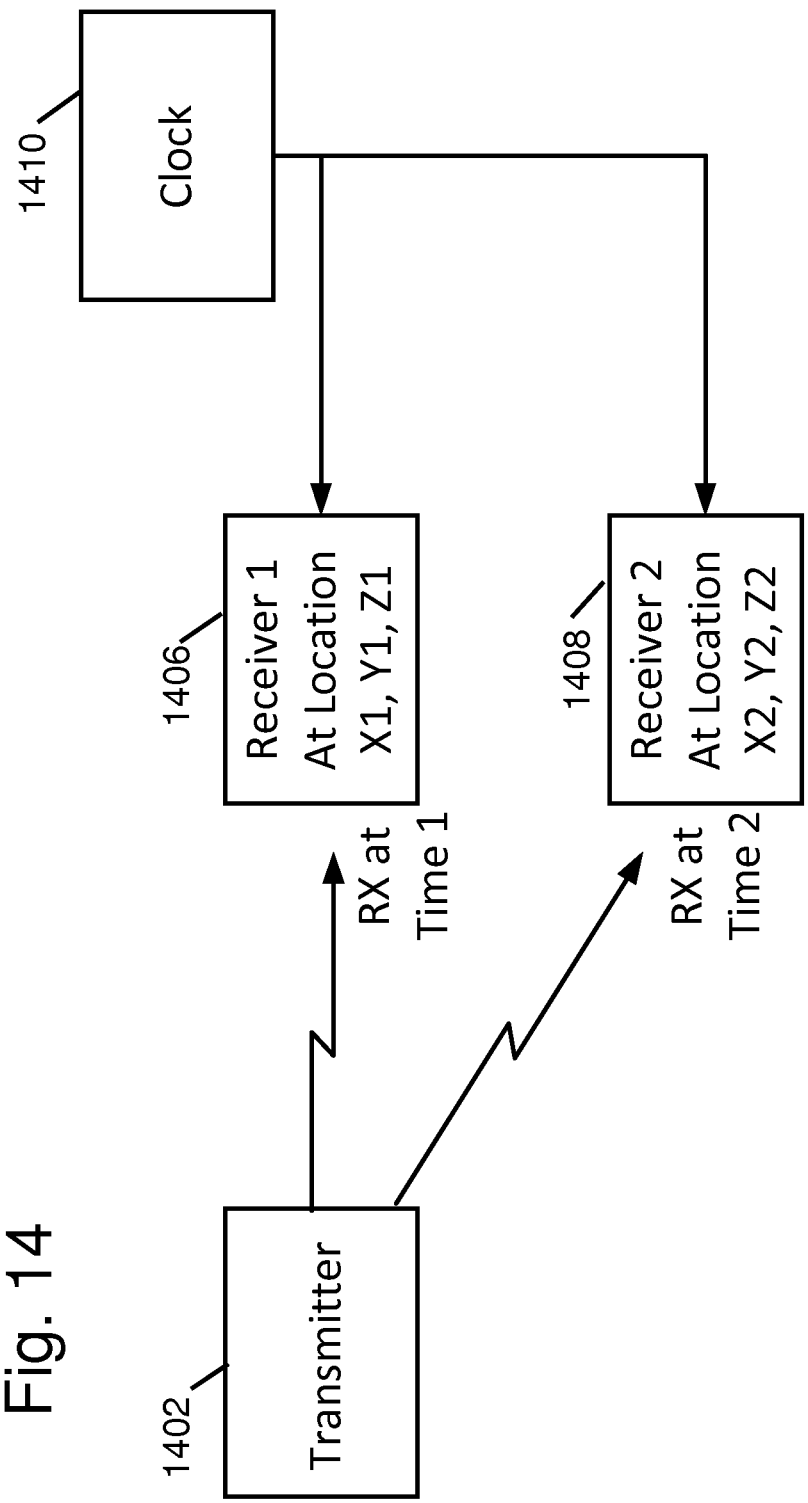
FIG. 14 illustrates an exemplary time difference of arrival technique for distance and/or direction for use with the present system.
Figure 15:
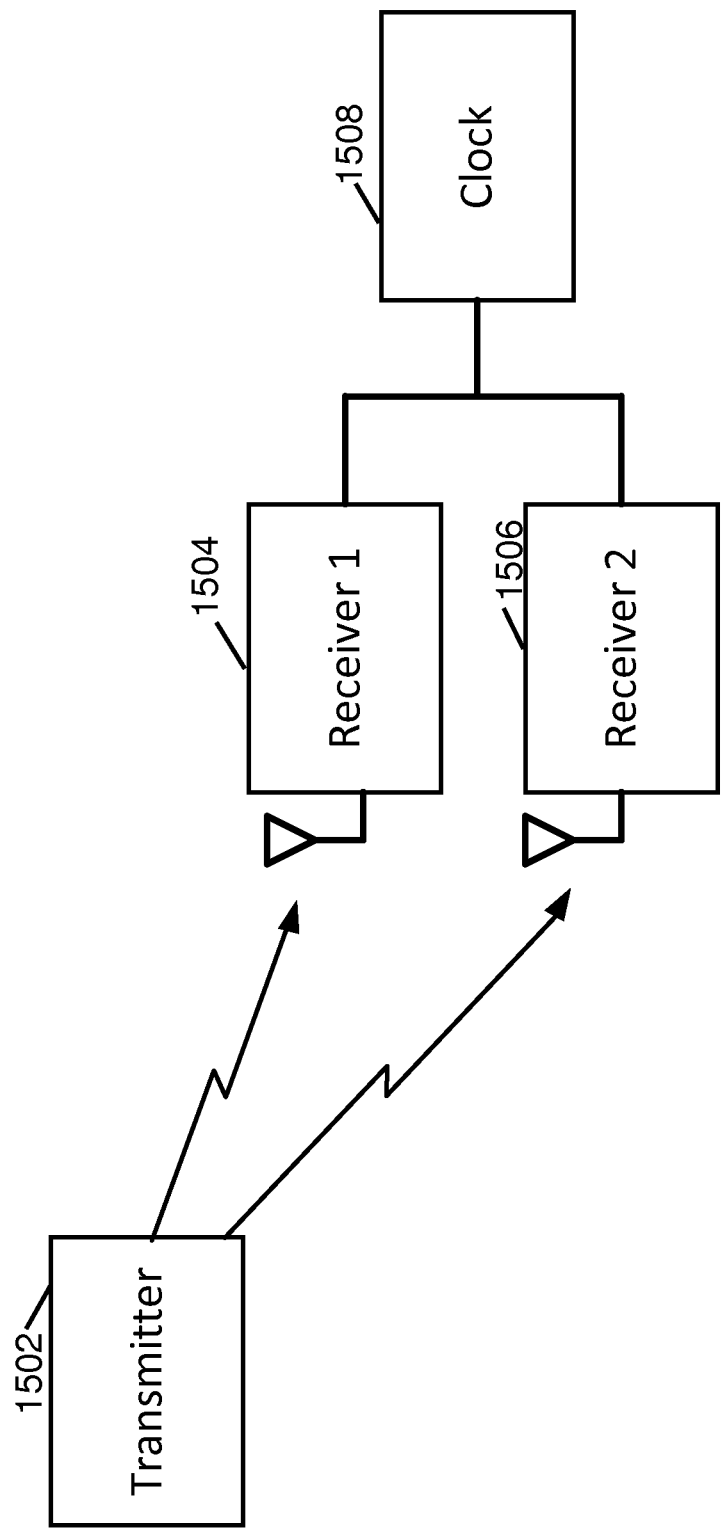
FIG. 15 illustrates an exemplary angle of arrival technique for use with the present system.

Various locating methodologies may be combined or used in isolation (individually). Transceivers enabled with circuitry to measure the time at which packets are received can use a Two-Way Time of Flight technique to calculate the distance between two transceivers (FIG. 4). Multiple Time of Flight measurements can be applied in a triangulation algorithm to determine device position. Systems using a known or synchronized timebase may use a single transmission to measure the Time of Arrival and calculate a distance between two devices, or may combine measurements between multiple devices to triangulate a position (FIG. 14). For systems in which a device's transmit time is unknown, but in which the TOA can be measured across a plurality of receivers sharing a common timebase, the Time of Arrival of the signal can be compared between each pair of receivers to determine a Time Difference of Arrival (TDOA) (FIG. 14). Each TDOA measurement describes a three-dimensional hyperbolic surface, and the intersection of multiple surfaces can be used to calculate an accurate position of the transmitting device. In another variation, a receiver equipped with multiple antennas, or multiple synchronized receivers may be used to measure the Angle of Arrival of a transmitted signal (FIG. 15). The intersection of multiple Angle of Arrivals can be used to calculate the location of the transmitting device.

In one variation, the smart device app may observe a Bluetooth Smart® beacon signal using a connectionless communication protocol (e.g. BLE advertisements), avoiding the necessity of a pin number or other security protocol overhead, thus greatly speeding each measurement and reducing the power requirement. See FIG. 19a, FIG. 19b, FIG. 20a, FIG. 20b. A new Bluetooth protocol (Bluetooth® Smart or Bluetooth® 4.0) may be used for this operation mode.

The smart device location service may determine site ID information, smart device ID information, time stamp information (for each position determination), and other information.

This information may be sent to the cloud server using WiFi®, 3G/4G Network, or other network connection. The smart device app may receive a pre configured store/location name and other information from the cloud server based on beacon ID collected by the location service on the smart device.

The cloud server may include site configuration, billing, web server, report engine, account management, database applications, and other applications. In one variation, the site management may have internet access to site configuration to reconfigure beacon locations and product information and promotions or relevant information and content. The site management may also view report engine output to review smart device location, time markers, and context.

In one variation, one or more of the servers may be the same server, or hosted at the same location or under the same management. For example the distribution server for distributing the application software to the smart device may be the same server as the application server or cloud server or both.

Figure 2:
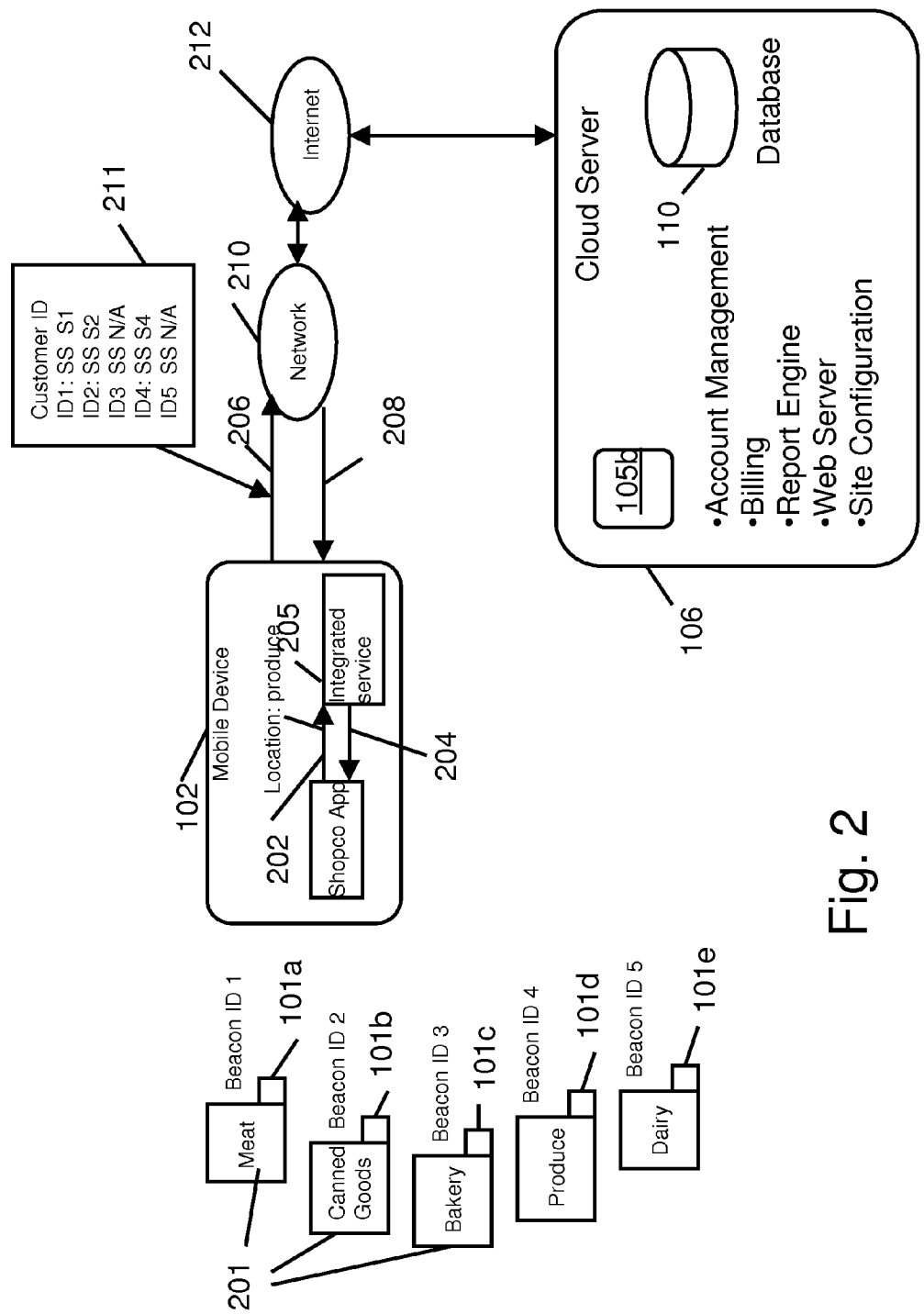
FIG. 2 illustrates an exemplary system wherein the location algorithm is in the cloud.

FIG. 2 illustrates an exemplary system wherein the location algorithm is in the cloud.

Referring to FIG. 2, the beacons are each located with a respective category 201 of product, for example beacon 101a is located with the meat department, as shown. All beacons transmit concurrently according to each respective protocol so that they do not interfere with one another. The customer's mobile device receives each beacon signal within range and records the ID and signal strength. The mobile device then sends the ID and signal strength 211 for all beacons over the cloud network (comprising the local network 210 and Internet 212) to the cloud server 106 for location processing at 105b in the cloud server 106. The cloud server then performs contextualization by accessing the location database to determine the closest department, or best match department based on the determined signal location and predefined store layout defined during store configuration. The contextualized location is then sent back 208 to the mobile device app, which may then request information and services from the application server (FIG. 1) based on the contextualized location.

Figure 3:
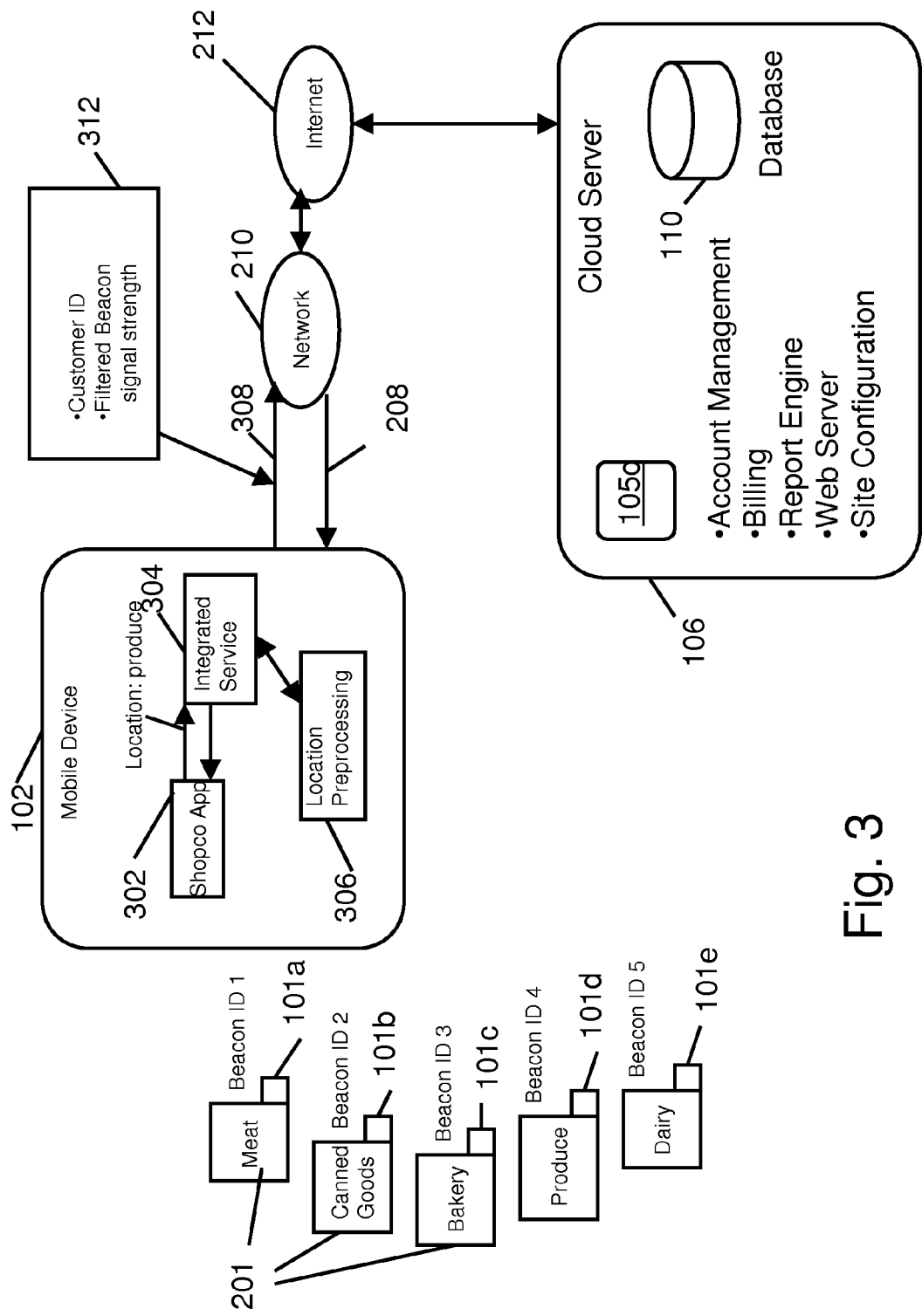
FIG. 3 illustrates an exemplary system utilizing a distributed location algorithm.

FIG. 3 illustrates an exemplary system utilizing a distributed location algorithm.

Referring to FIG. 3, FIG. 3 is much like FIG. 2, but the mobile device includes location preprocessing 306. Location preprocessing may perform such tasks as, for example, filtering signal strength measurements from beacons to reduce the noise and reduce the data required to be sent to the cloud server. Filtered data may be sent less frequently to the cloud server, reducing packet traffic on the network. Also, since the mobile device is filtering the data, many more beacon transmissions may be performed, since cloud server traffic limitations are not an issue. This also allows weaker, more distant, beacons to be included in the location solution since the filtering may bring weak signal out of the noise. Once the signal strengths are filtered, the filtered data 312 is sent 308 to the cloud server 106 for processing at location engine 105c. Again, the cloud server uses the location result with the location database to determine the contextualized location, which is sent back 208 to the mobile device app.

Beacon Obfuscation

One variation of the system relates generally to the field of securing access to the location of people or assets (including smart devices) derived from radio frequency transmitters associated with pre-configured zones or categories.

If these beacon properties are left static, a library of contextualized locations may be grown by anyone willing to record these properties and map them to associated zones or categories at the deployment site (for example, products in a store), and such a library may be used to deliver context specific information through Smart Device Applications unapproved by the manager of the deployment site.

A method of preventing such construction of such an unapproved library may involve changing the publicly available properties of the radio frequency beacon at specified intervals according to a mathematical function known only to the system that maintains the approved library.

In one variation, the transmitters may be Bluetooth® and Bluetooth Smart® beacons whose properties, including identification and signal strength may be accessible by any Smart Device with Bluetooth® capabilities.

FIG. 4 illustrates an exemplary system wherein the identifiable Beacon Properties (ID) change simultaneously on the beacon itself and in the approved Contextualized Location library. Referring to FIG. 4, a plurality of beacons are deployed in a service area, for example, a retail store. Each beacon is placed near a specific product category. A customer of the store operates a smart device running an application (app) that provides contextual information. The app detects proximity and/or distance from one of the beacons and interfaces with one or more servers to provide product information, incentives, coupons, or other information related to the product. The app sends the beacon ID to the cloud server. The beacon ID is then identified, enabling retrieval of associated information for that beacon. The associated information is then sent to the smart device app for display/delivery to the customer.

The system may be potentially vulnerable to a competing app being developed by another to use the beacons and bypass the cloud server to provide competing information or possibly bypassing fees or charges for the cloud server services. Thus, it may be desirable to prevent use of the beacons by unauthorized third parties.

In one variation, the beacon ID is varied according to an algorithm known only to the authorized system, i.e., having one or more parameters not disclosed to the public. The beacon ID is sent in the clear, i.e., unencrypted. Thus, two way communication to convey encryption keys or to establish trust is not necessary and in some variations, not possible. The beacons may be transmitters, not transceivers, periodically transmitting information without the need for receiving information. In one variation, the beacon ID may change periodically according to independent, but synchronized time clocks in each beacon. The beacon ID may be a sufficiently long number to not repeat or be duplicated among the deployed set of beacons over a period of time such that there is no confusion as to which beacon is being received.

Upon deployment of each beacon, each beacon may be loaded with an algorithm and the clock may be synchronized with a standard. Thereafter, the clock may continue on its own until reset, lasting a month, year or more on a battery. Alternatively, the clock may be periodically reset by, for example a WWV receiver in each beacon or other synchronizing means.

The algorithm may be any algorithm that provides sequential ID's in a sufficiently unpredictable sequence to prevent prediction by a third party and allow synchronizing by the system server. In one variation, the algorithm is a predetermined list. Memory is inexpensive and a very long list may be generated and tested for duplication among the other tags and a respective list loaded into each tag. Each list may be generated by a random or pseudorandom number generator. If duplicate Ds are generated for a particular time slot, the offending ID may be deleted and a new random number generated. The resulting list, then would be without duplications for the same time slot, or any potentially concurrent time slot due to clock drift.

Alternatively, the algorithm may be a pseudo random number generator. The server would run the same pseudorandom number generator to determine the match. Multiple beacons may use the same pseudorandom number generator, but with different random seed numbers. Some pseudorandom number generators may be undesirable because they can be discovered by observation over time. Thus, very long numbers would be selected as generators. Potentially a few digits of the long number may be sufficient to be used as an ID. Since random numbers may occasionally generate a duplicate, a long ID number may be used to reduce the occurrence of duplicates to an acceptably infrequent event.

FIG. 5a and FIG. 5b illustrate an exemplary time synchronous method by which the identifiable Beacon Properties change according to a secret mathematical function. FIG. 5a shows a time sequence of transmission and matching generation of beacon ID's. Referring to FIG. 5a, shows a beacon 101 generating and transmitting a sequence of ID numbers referred to as ID:A through ID:F. A new ID number is generated for each integral time interval.

FIG. 5b shows the matching ID generated in the database. Note that an overlapping time period is allowed where two ID's will be valid for a given beacon to allow for drift between the two clocks. For example ID:A and ID:B overlap from time=1 to about time=1.3 as exemplified by FIG. 5b. The overlapping interval is shown as ID:AB, where both ID:A and ID:B are valid. Overlapping intervals are also shown for ID:BC, ID:CD, ID:DE, and ID:EF for the respective time intervals. Any desired overlap may be used as needed for a given system. Alternatively, a range of ID's may be valid for a given beacon to allow for greater clock drift. In a further alternative, the server may track the drifting clock of the beacon to narrow the range of overlap.

The time periods are shown as equal integral units. The particular time period should be frequent enough to make the task of updating an unauthorized system difficult. For example a time period of one day would require the unauthorized system to observe the beacons and update the unauthorized system once a day, soon after the change of ID. An interval of one hour makes the process more tedious. An interval of one minute would seem to require an automated system, which would place a cost burden on the unauthorized system. An interval of one second further frustrates the unauthorized system.

The time periods may also vary from one time period to the next. The server would also vary the matching time period. The time periods may be different for each beacon among a set of beacons. The server would keep separate track of each beacon.

Transceive Beacon

Figure 6:
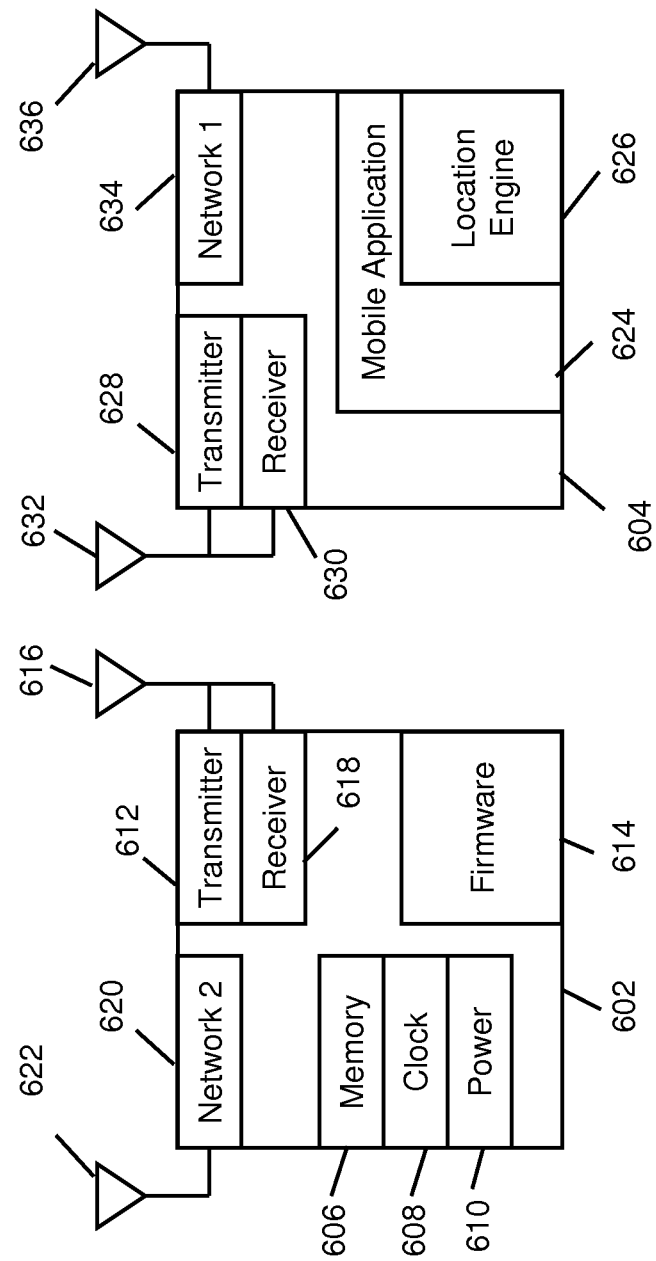
FIG. 6 illustrates an alternative beacon and smart device enabling receive and transceive capability at the beacon device.

FIG. 6 illustrates an alternative beacon and smart device enabling receive and transceive capability at the beacon device. FIG. 6 shows a transceive beacon device 602 and a corresponding mobile device 604. The transceive beacon 602 comprises the features of the beacons as shown in FIG. 4, including the memory 606, clock 608, power 610 and transmitter 612 with the firmware 614 previously described. In addition, the transceive beacon 602 may include a receiver module 618 and may optionally include a second network module 620 with associated antenna 622. The beacon transmitter 612 and receiver 618 may share a single antenna 616 if desired.

The mobile device 604 comprises the computing device with mobile application and location engine as previously described with reference to FIG. 4. A typical mobile device 604 may have a fully implemented short range transceiver comprising a transmitter 628, receiver 630 and antenna 632. (for example, Bluetooth®). The transceiver may be capable of receiving beacon only signals and optionally capable of transceiver interaction to interface with a transceiver beacon implementation. The mobile device may also include a first network interface 634 and antenna 636. The first network may comprise a cell phone network, WiFi®, or other RF network. The first network 634 and second network 620 may be the same or different network systems. For example, the beacons 602 may be on a WiFi® network, whereas the mobile devices 604 may connect to a server via a cell phone network.

Transceive Beacon Network

Figure 7:
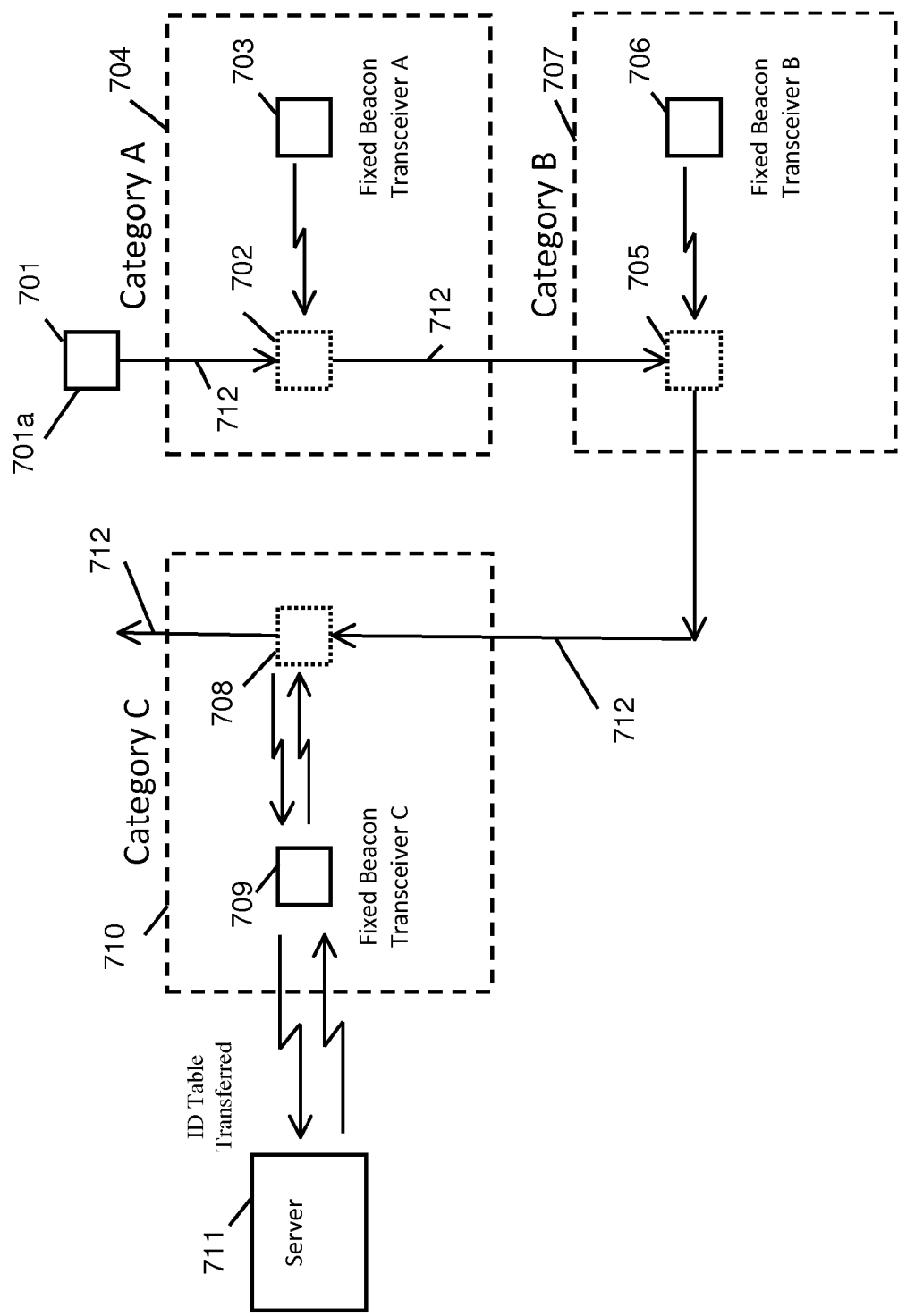
FIG. 7 illustrates an exemplary system wherein a mobile alternative beacon transits an area populated by category-associated fixed alternative beacons for the purpose of recording and relaying category associations and timestamps.

FIG. 7 illustrates a network of alternate beacons allowing ID store-and-forward capability from the mobile beacon to a server. FIG. 7 illustrates an exemplary system wherein a mobile alternative beacon transits an area populated by category-associated fixed alternative beacons for the purpose of recording and relaying category associations and timestamps. For example, the mobile beacon may be attached to a shopping cart. The mobile beacon records beacon ID, amplitude or other position information, and records a time stamp. The result is a path history record of a shopper through the store. The history is downloaded to the server when the mobile beacon comes within range of a device having a link to the server. The server may then relate received beacon ID and amplitude information to determine category information. The record may be used by the marketing department to analyze shopping patterns. The network server may be configured to generate, store, and present historical and real-time data records of said mobile transceiver as associated with said beacon zones or categories.

FIG. 7 depicts a mobile beacon 701 (alternatively referred to as a mobile transceiver) at initial position 701a then transitioning along path 712 to positions 702, 705, and 708. Beacon 701 passes through category A region 704 containing fixed beacon A 703. A category region may be, for example, a produce section in a grocery store, or more targeted, an apple section, as desired and configured by the store manager. Generally, any region may be configured to be covered by the associated fixed beacon. The beacon is shown also passing through category B 707 with fixed beacon B 706 and category c 710 with fixed beacon C 709. Fixed beacon C 709 can also communicate with server 711.

In operation, the mobile beacon 701 is initially not in range of other beacons. After transiting to location 702, the mobile beacon registers the ID and timestamp of fixed beacon A 703, associated with Category A 704. Registering means storing the information in memory in mobile beacon 701.

The mobile beacon 701 continues its transit to location 705, where it registers the ID and timestamp of fixed beacon B 706, associated with Category B 707.

At the final transit point 708, the mobile beacon registers the ID and timestamp of fixed beacon C 709, associated with Category C 710. Additionally, the mobile beacon 701 at location 708 transmits a data record of accumulated IDs and timestamps to fixed transceiver C 709. Fixed transceiver C 709 then relays the data record to the server 711.

FIG. 8a through FIG. 8c show exemplary user tasks for various potential users and implementers of the system. FIG. 8a shows functions performed by a software developer. A software developer might be interested in utilizing a deployed base of beacons with a supported and updated context location engine to deliver educational information about products to customers. The software developer would download a software development kit 802 with a family of application programming interfaces usable by software developers. The software developer would then integrate his application with the smart application 804, configure his application software to utilize location context content 806, and then push the new application to his base of users 808.

FIG. 8b shows functions performed by a system administrator to set up a store and keep the store system operational. The system administrator may start by assigning ID's to beacons, create a store site, associate beacons with site, create categories, assign beacons to respective categories, configure beacon parameters, for example, but not limited to transmit power, transmit rate, protocol, security parameters and key, set time clock and set other parameters as needed. Once all beacons are set up and assigned, process is complete.

FIG. 8c shows functions performed by a user, i.e., customer of the store. The user downloads the mobile application and runs the mobile app when present in the store or site. The mobile app interacts with the integrated service location engine and cloud server to determine category proximity. The mobile app provides the user with content based on category proximity. The mobile app interacts with the cloud server to store the users history of inputs and interactions.

Figure 9:
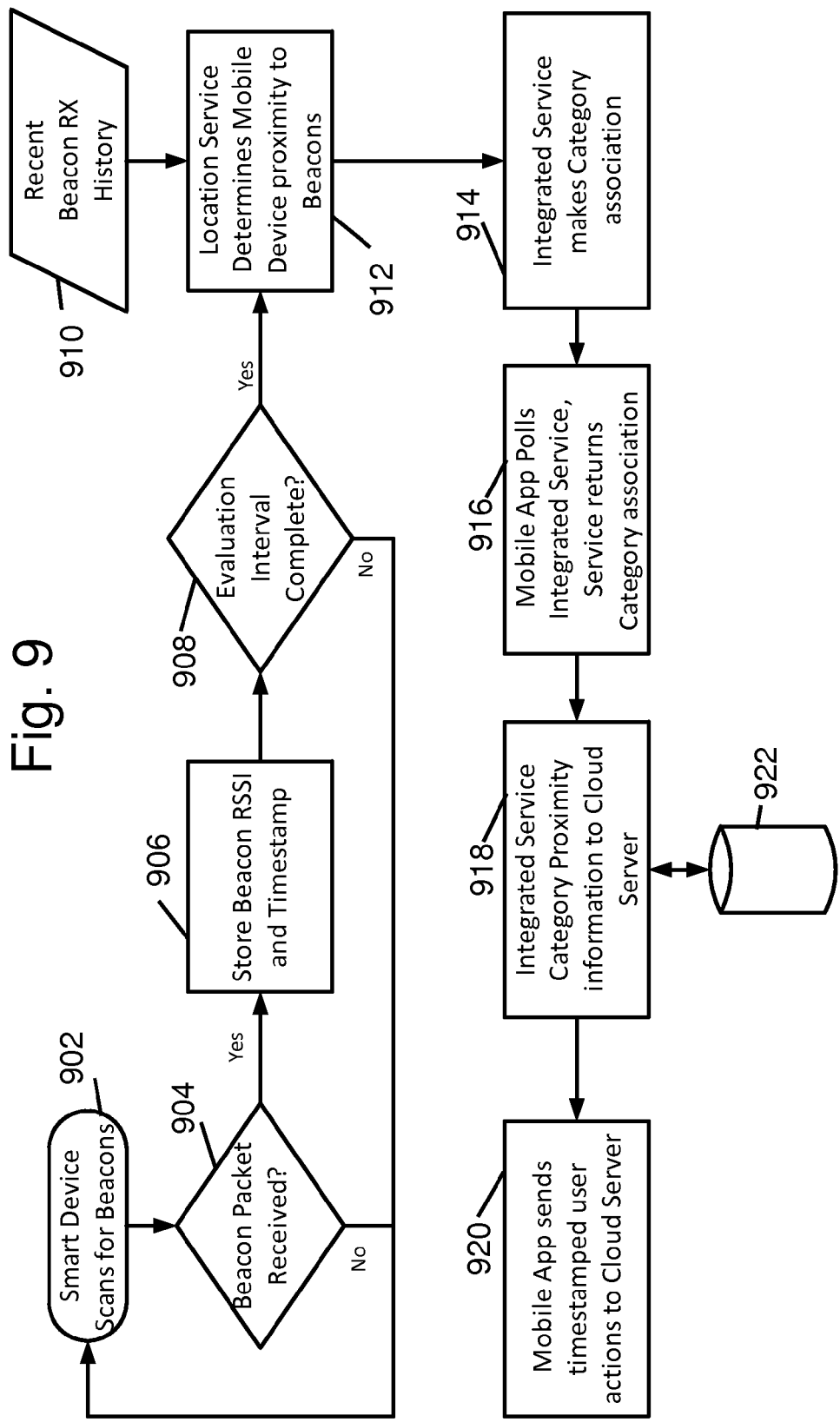
FIG. 9 illustrates an exemplary process for user experience enhancement using the present system.

FIG. 9 illustrates an exemplary process for user experience enhancement using the present system. Referring to FIG. 9, the user upon entering the store starts the store app on the smart device. The smart device app then scans for beacons. When a beacon packet is received, the app determines signal strength (RSSI), time stamps the data and stores the data in memory. When an evaluation interval is complete, the location service, running on the smart device is called to determine mobile device (smart device) proximity to beacons by combining new packet data with history data. The integrated service then makes category association. The mobile app polls the integrated service and integrated service returns category association. Integrated service category information is sent to cloud server and stored on cloud server. The mobile app sends time stamped user actions to cloud server.

Figure 10:
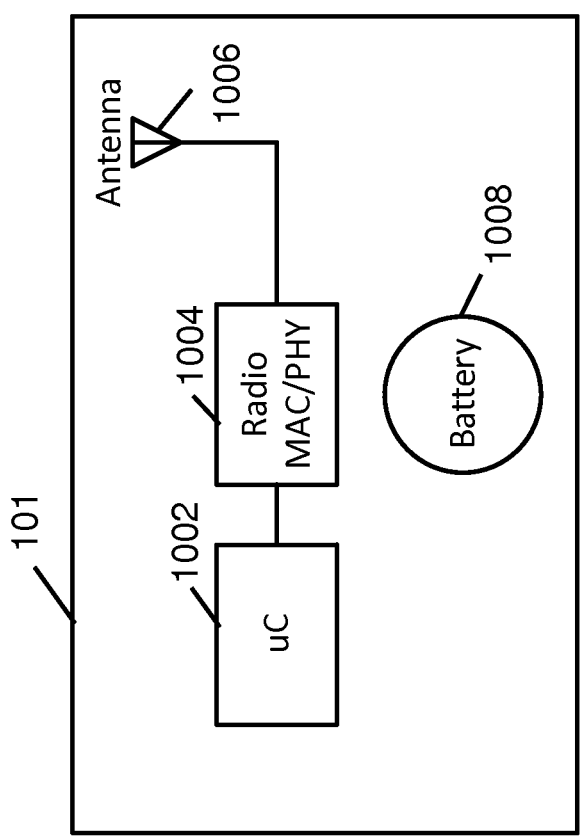
FIG. 10 illustrates an exemplary basic beacon for use with the present system.

FIG. 10 illustrates an exemplary basic beacon architecture comprising a microcontroller 1002, radio MAC and PHY 1004, battery 1008 and antenna 1006.

Figure 11:
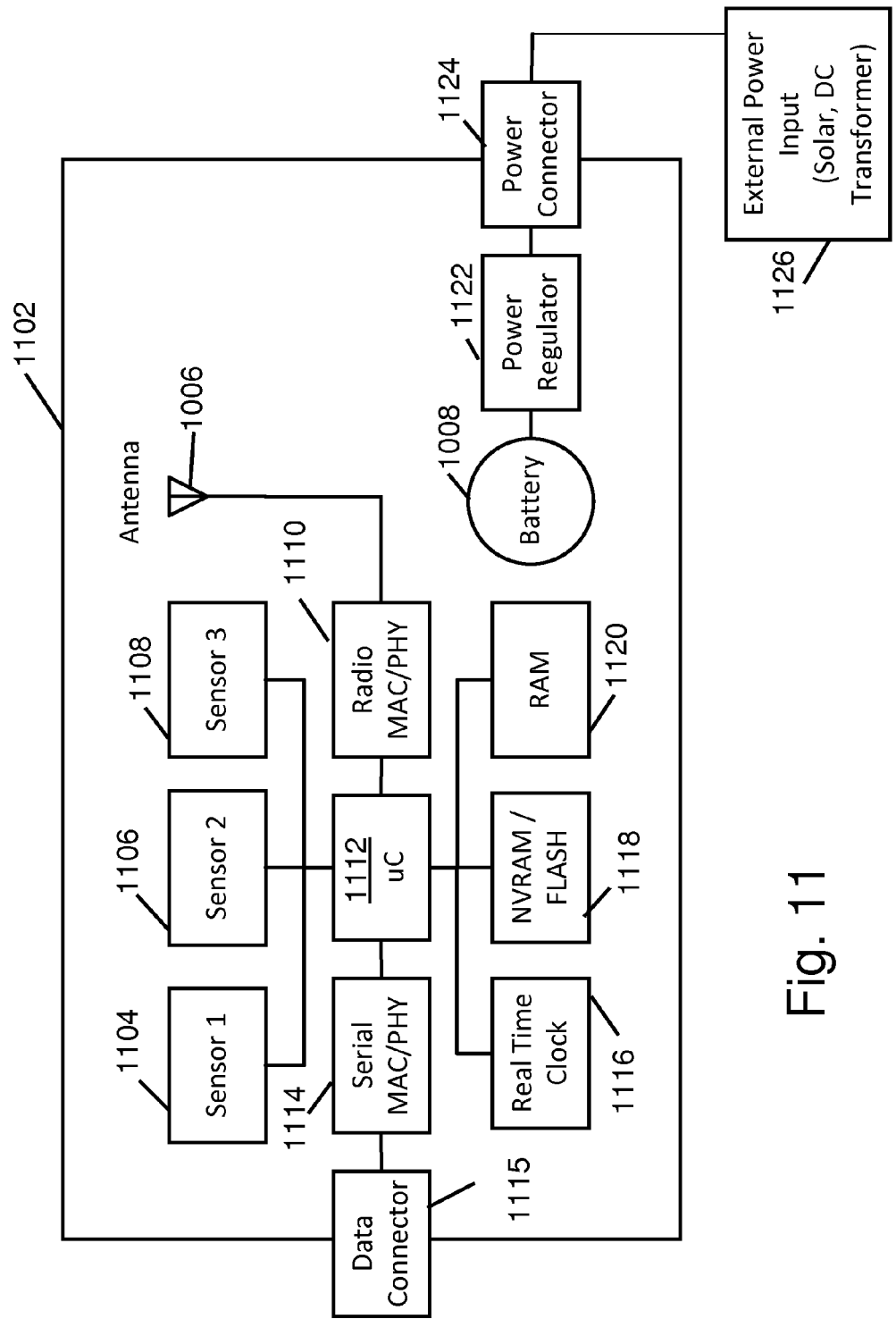
FIG. 11 illustrates an exemplary beacon having extended features for use with the present system.

FIG. 11 illustrates an exemplary beacon having extended features for use with the present system. FIG. 11 illustrates a beacon incorporating additional capability including an upgraded microcontroller 1112, a radio MAC/PHY 1110 and antenna 1006, a wired data interface 1115 (e.g. USB with USB MAC/PHY 1114), one or more sensors 1104, 1106, 1108 for producing enhanced data such as measurement of light, humidity, temperature, acceleration, orientation, motion, etc., a realtime clock 1116 for enhanced timestamp capability, additional memory 1118 1120, for enhanced data record management and network state activity, and the option of battery 1008 or alternate power input 1126 mechanisms such as solar energy with power connector 1124 and regulator 1122. These additional capabilities may serve to enhance the basic context-aware location service be enabling more precise locating algorithms and a higher rate of data transmission.

Figure 12:
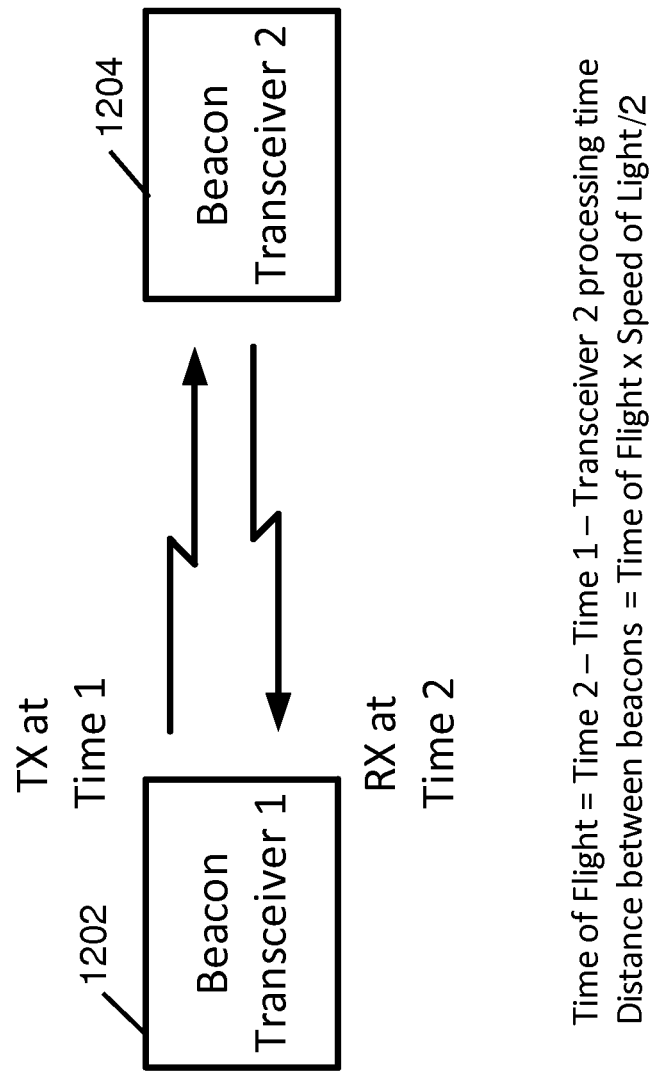
FIG. 12 illustrates an exemplary time of flight distance measuring technique for one embodiment of the present system.

FIG. 12 illustrates an exemplary time of flight distance measuring technique for one embodiment of the present system. The time of flight system may be implemented between beacons with extended capability to make the precision measurements. The beacon may also include a transceiver with distance measurement capability, for example an ultrawideband or other spread spectrum transceiver for communication and measurement among beacons. Typical user smart phones do not presently have such capability, but may in the future. Beacon transceiver 1 12002 initiates transmission at time 1. Beacon transceiver 2 12004 receives the transmission and determines a received time. Transceiver 2 then transmits a response a known processing delay time from the received time. Transceiver 1 then receives the response and determines a received time. The distance is calculated:

Time of flight=Time 2−Time 1−transceiver 2 processing time. Distance between beacons=time of flight×speed of light/2

Figure 13:
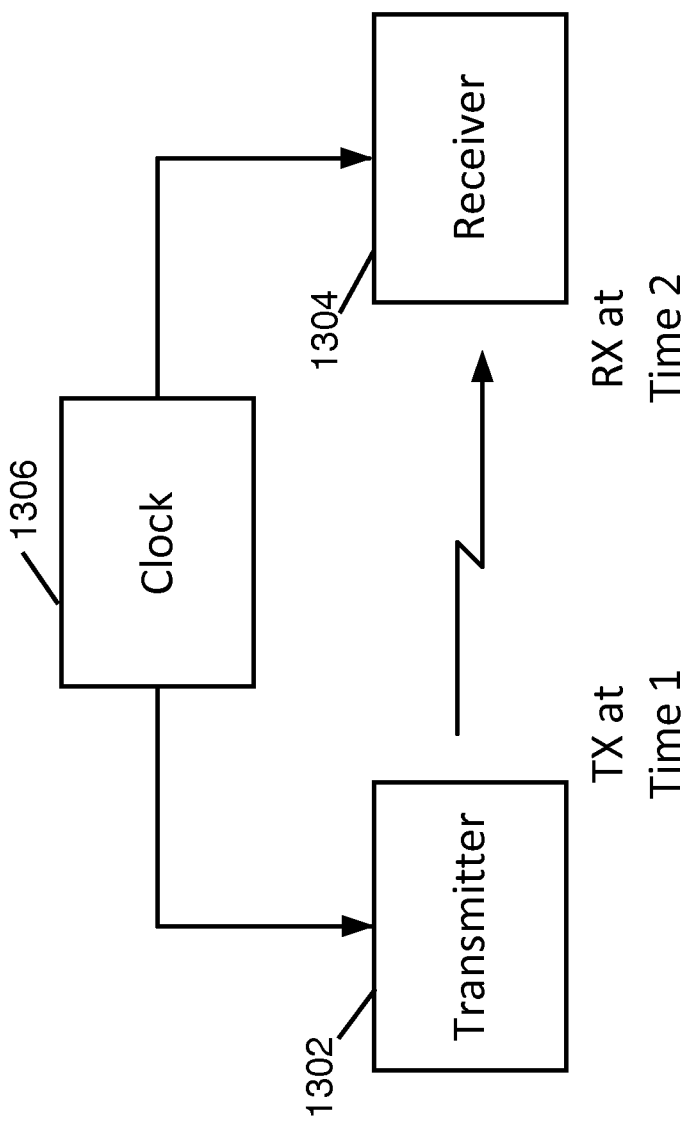
FIG. 13 illustrates an exemplary time of arrival distance measuring technique for use with one embodiment of the present system.

FIG. 13 illustrates an exemplary time of arrival distance measuring technique for use with one variation of the present system. Time of arrival may work where a common precision clock is available to the transmitter and receiver. The transmitter transmits at time 1 and the receiver receives the signal and determines a reception time of time 2. The distance is then calculated as:

Distance=(time2−time1)×speed of light

FIG. 14 illustrates an exemplary time difference of arrival technique for distance and/or direction for use with the present system. Time difference of arrival may be especially useful when combined with other information to find a position of an object. Two receivers 1406 and 1408 are separated a known distance and direction. The transmitter 1402 transmits and the time difference (TDOA=Time2−Time1) may be used to determine a locus of possible positions from an intersection of hyperbolic surfaces. The unique position may typically be found by combining with other information, for example distance information.

FIG. 15 illustrates an exemplary angle of arrival technique using synchronized receivers for use with the present system. Angle of arrival may be derived from timing and may also be derived from antenna pattern or phasing, which may be available to narrow band systems.

Figure 16:
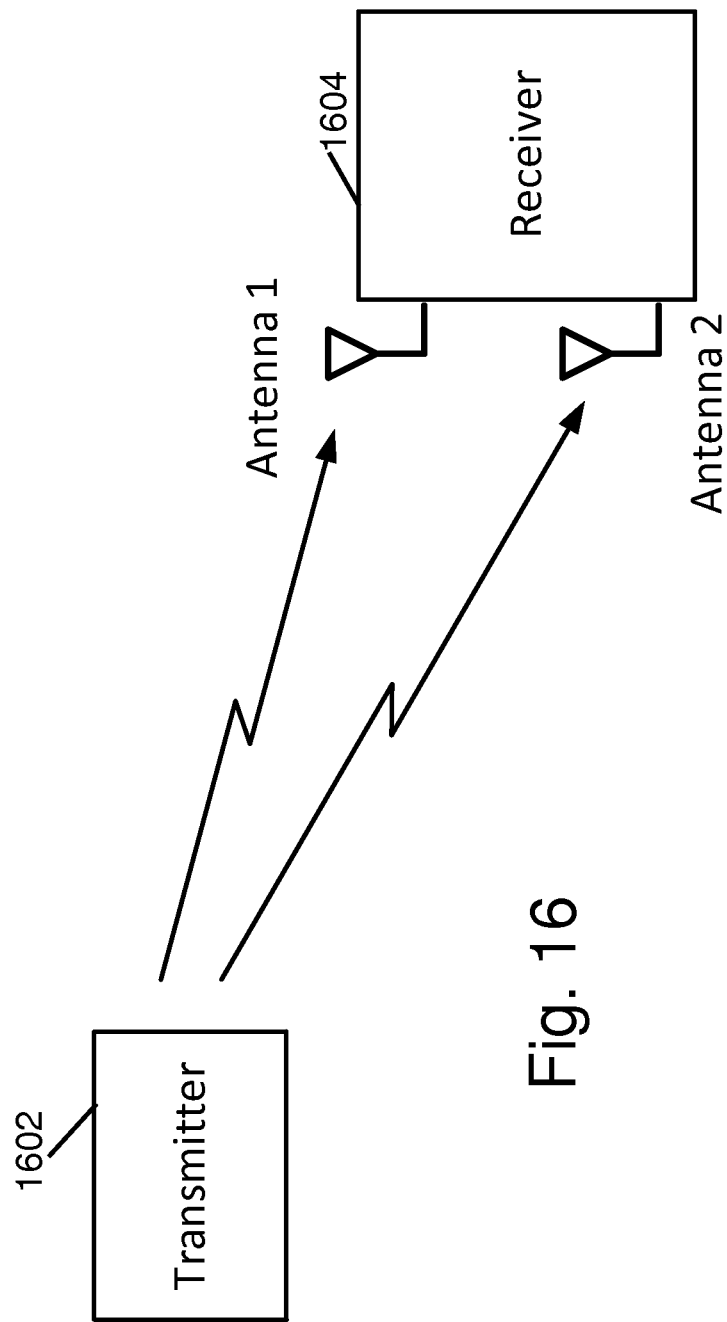
FIG. 16 illustrates an exemplary angle of arrival using a dual receiver for use with the present system.

FIG. 16 illustrates an exemplary angle of arrival using a dual receiver for use with the present system.

FIG. 17a through FIG. 17c illustrate various beacon transmission repetition rates that may be used simultaneously, or concurrently with the present system. Referring to FIG. 17a, beacon 1 1702 is shown transmitting with a packet repetition rate of 0.5 Hz at a power level of P1, low power. FIG. 17b shows beacon 2 transmitting at a packet repetition rate of once per second with a power level of P2, medium power. FIG. 17c shows beacon 3 transmitting with a packet repetition rate of two packets per second at power level P3, high power. In one variation, the three beacons may use frequency hopping to avoid or reduce interference so that beacon 1 may operate at the same time as beacon 3, as shown.

FIG. 18a and FIG. 18b illustrate exemplary beacon packet structures. FIG. 18a shows a general beacon packet structure. The packet structure shows a preamble to help identify the packet, an address, a data payload and a CRC section.

FIG. 18b shows an exemplary Bluetooth® Low Energy (BLE) Lightweight Link Layer Packet structure. In one variation, the beacon may use Bluetooth® Low Energy and may operate in advertising mode with transmit only capability. In alternate variations, the beacon may operate in a connection mode and receive as well as transmit. The data payload may include the beacon ID information as well as sensor information, if implemented.

Figures 19A, 19B:
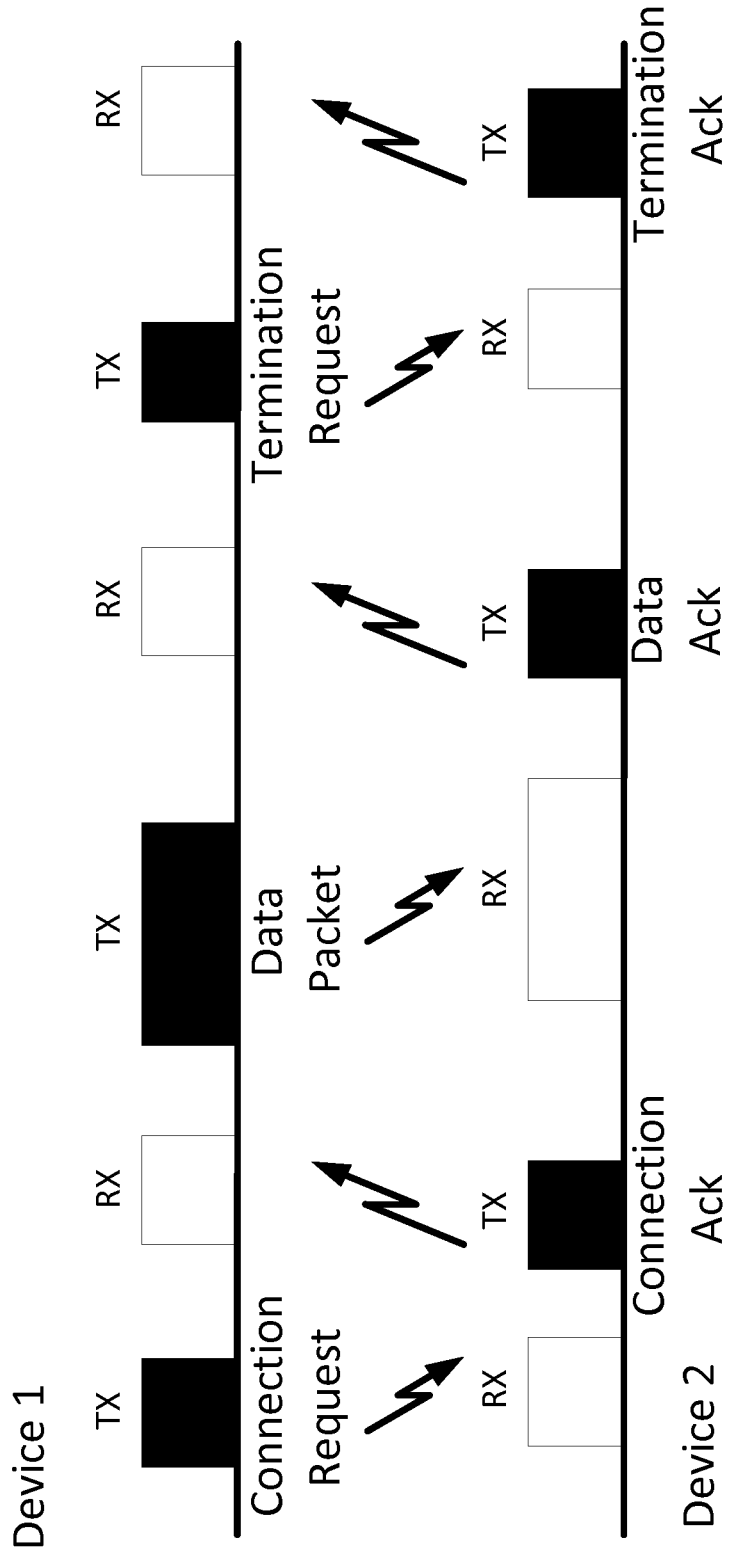
FIG. 19a and FIG. 19b illustrate an exemplary timing diagram for a connection oriented protocol for use with the present system.

FIG. 19a and FIG. 19b illustrate an exemplary timing diagram for a connection oriented protocol for use with the present system. The connection protocol may be useful for systems with networked beacons as in FIG. 7, wherein the beacons intercommunicate with one another and may relay information to one another through the network. Referring to FIG. 19a and FIG. 19b, device 1 transmits a connection request, which is received by device 2. Device 2 then sends a connection acknowledgement to device 1. Device 1 then sends a data packet, which is received by device 2. Device 2 then sends a data acknowledgement, typically indicating the data was received without error, or possibly with error and needs retransmission. Device 1 receives the data ack and sends a termination request indicating end of data. Device 2 receives the termination request and sends a termination acknowledgement, which is received by device 1.

FIG. 20a and FIG. 20b illustrate and exemplary timing diagram for a connectionless protocol for use with the present system. The connectionless protocol of FIGS. 20a and 20b may be used for one way communications, as for a transmit only beacon, or may be used for two way communications as shown, wherein each path transmits without necessarily receiving a response. Referring to FIG. 20a and FIG. 20b, device 1 transmits data packet 1, which is received by device 2 without device 2 necessarily making a response. This is the end of the first communication. Device 1 then sends another packet at some later time, which is received by device 2 without device 2 sending a response. At some later time, device 2 may transmit data to device 1, which device 1 receives without sending an acknowledgement response.

CONCLUSION

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Relative terms such as vertical, horizontal, width, length, and height are used for convenience of description within the given context. The invention may be used in any orientation and such terms may be interchanged accordingly. Exemplary ranges suggested are intended to include any subrange consistent with the disclosure.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims.

What is claimed is:

1. A system for enhancing an enterprise software system with a location service comprising:
a beacon device for disposition proximal to an associated category, said beacon device configured for transmitting a beacon signal having an encoded beacon identification;
a distribution server connected to a network for distributing a smart device application to a smart device; said smart device application comprising an application module and an integrated service module;
said integrated service module configured for running on said smart device, said integrated service module configured for controlling said smart device for receiving said beacon signal and determining proximity information relating to a distance from said smart device to said beacon based on a received signal property of said beacon signal;
said integrated service module configured for network communication with a network server;
said integrated service module configured for communicating said proximity information to said network server and receiving category information based on said proximity information from said network server;
said integrated service module configured to communicate said category information to said application module;
said application module configured to send said category information to an application server in response to a user action and configured to receive category related information from said application server for display on said smart device, said application server separate from said network server.

2. The system in accordance with claim 1, wherein said proximity information is derived in accordance with a triangulation solution algorithm.

3. The system in accordance with claim 1, wherein said proximity information is derived in accordance with a hyperbolic solution algorithm.

4. The system in accordance with claim 1, wherein said proximity information comprises two-dimensional position information.

5. The system in accordance with claim 1, wherein said proximity information comprises three-dimensional position information.

6. The system in accordance with claim 1, wherein said integrated service module is configured to read said encoded beacon identification without engaging in an interactive connection protocol with said beacon device.

7. The system in accordance with claim 1, wherein said received signal property is beacon signal strength, and wherein said integrated service module is configured to determine said beacon signal strength without engaging in an interactive connection protocol with said beacon device.

8. The system in accordance with claim 1, wherein said beacon device transmits an indication of transmitted signal level.

9. The system in accordance with claim 1, wherein said network server is configured to run a location engine algorithm to determine a location for said smart device based on said proximity information.

10. The system in accordance with claim 9, wherein said network server is configured to determine contextualized location information based on said location for said smart device and is configured to communicate said contextualized location information to said integrated service module.

11. The system in accordance with claim 9, wherein the application module is configured to initiate an action based on said contextualized location information received.

12. The system in accordance with claim 11, wherein the application module is configured to log user action information with time marker information and send the user action information and time marker information to said application server.

13. The system in accordance with claim 1, wherein the encoded beacon identification is configured to change in accordance with a time schedule, and wherein the encoded beacon identification is configured to change in accordance with a mathematical process having at least one parameter not publicly disclosed.

14. The system in accordance with claim 13, wherein the network server is configured to utilize overlapping sequential periods having an overlapping interval and permits at least two encoded beacon identification values during the overlapping interval.

15. The system in accordance with claim 14, further including a plurality of beacons transmitting a respective plurality of encoded beacon identification values, wherein the respective encoded beacon identification values are chosen to avoid duplication of the same encoded beacon identification value for a given time period among the beacons of the plurality of beacons.

\* \* \* \* \*